US008012012B2

(12) United States Patent
Sugano

(10) Patent No.: US 8,012,012 B2
(45) Date of Patent: Sep. 6, 2011

(54) SLOT MACHINE

(75) Inventor: Kenta Sugano, Tokyo (JP)

(73) Assignee: Universal Entertainment Corporation, Tokyo (JP)

(*) Notice: Subject to any disclaimer, the term of this patent is extended or adjusted under 35 U.S.C. 154(b) by 700 days.

(21) Appl. No.: 12/123,741

(22) Filed: May 20, 2008

(65) Prior Publication Data

US 2008/0318661 A1 Dec. 25, 2008

(30) Foreign Application Priority Data

Jun. 21, 2007 (JP) ................................ 2007-163989

(51) Int. Cl.
*G06F 17/00* (2006.01)

(52) U.S. Cl. ........................................................ 463/20

(58) Field of Classification Search ............... 463/16–25
See application file for complete search history.

(56) References Cited

U.S. PATENT DOCUMENTS

| | | | |
|---|---|---|---|
| 6,168,523 | B1 | 1/2001 | Piechowiak et al. |
| 6,802,778 | B1 | 10/2004 | Lemay et al. |
| 2005/0054416 | A1 | 3/2005 | Hostetler et al. |
| 2006/0160607 | A1 | 7/2006 | Okada |
| 2007/0066384 | A1 | 3/2007 | Okada |

OTHER PUBLICATIONS

Macao Official Action dated Mar. 5, 2010; English translation included.

*Primary Examiner* — Ronald Laneau
(74) *Attorney, Agent, or Firm* — NDQ&M Watchstone LLP

(57) ABSTRACT

A processor selects either a first game mode or a second game mode based on the operation by the operator carried out at a server 102. If the first game mode has been selected, a payout is calculated and awarded based on a fixed payout set in advance for each winning combination. Alternatively, if the second game mode has been selected, a payout is calculated and awarded based on a progressive payout and a fixed payout which was set in advance for each winning combination.

4 Claims, 12 Drawing Sheets

FIG. 1

1ST GAME MODE

| WINNING COMBINATION | | | PAYOUT AMOUNT |
|---|---|---|---|
| RED7 | RED7 | RED7 | 100 + FREE GAME |
| BLUE 7 | BLUE 7 | BLUE 7 | 10 + FREE GAME |
| BELL | BELL | BELL | 8 |
| APPLE | APPLE | APPLE | 7 |
| CHERRY | CHERRY | CHERRY | 5 |
| STRAWBERRY | STRAWBERRY | STRAWBERRY | 5 |
| PLUM | PLUM | PLUM | 4 |
| ORANGE | ORANGE | ORANGE | 3 |
| CHERRY | CHERRY | (ANY) | 2 |
| ORANGE | ORANGE | (ANY) | 2 |
| CHERRY | (ANY) | (ANY) | 1 |
| ORANGE | (ANY) | (ANY) | 1 |

FIG. 2

2ND GAME MODE

| WINNING COMBINATION | | | PAYOUT AMOUNT |
|---|---|---|---|
| RED7 | RED7 | RED7 | Jack Pot |
| BLUE 7 | BLUE 7 | BLUE 7 | 10 + FREE GAME |
| BELL | BELL | BELL | 8 |
| APPLE | APPLE | APPLE | 7 |
| CHERRY | CHERRY | CHERRY | 5 |
| STRAWBERRY | STRAWBERRY | STRAWBERRY | 5 |
| PLUM | PLUM | PLUM | 4 |
| ORANGE | ORANGE | ORANGE | 3 |
| CHERRY | CHERRY | (ANY) | 2 |
| ORANGE | ORANGE | (ANY) | 2 |
| CHERRY | (ANY) | (ANY) | 1 |
| ORANGE | (ANY) | (ANY) | 1 |

FIG. 5

| CODE NUMBER | LEFT REEL | CENTER REEL | RIGHT REEL |
|---|---|---|---|
| 21 | RED7 | RED7 | RED7 |
| 20 | PLUM | BELL | CHERRY |
| 19 | ORANGE | APPLE | ORANGE |
| 18 | PLUM | BELL | APPLE |
| 17 | ORANGE | CHERRY | ORANGE |
| 16 | PLUM | ORANGE | PLUM |
| 15 | ORANGE | PLUM | ORANGE |
| 14 | PLUM | CHERRY | PLUM |
| 13 | BLUE 7 | BELL | ORANGE |
| 12 | CHERRY | APPLE | PLUM |
| 11 | ORANGE | BELL | ORANGE |
| 10 | BELL | SYRAWBERRY | PLUM |
| 09 | ORANGE | PLUM | BELL |
| 08 | SYRAWBERRY | BLUE 7 | SYRAWBERRY |
| 07 | BLUE 7 | BELL | BLUE 7 |
| 06 | ORANGE | APPLE | BELL |
| 05 | APPLE | BELL | CHERRY |
| 04 | PLUM | SYRAWBERRY | PLUM |
| 03 | ORANGE | PLUM | ORANGE |
| 02 | PLUM | CHERRY | PLUM |
| 01 | BLUE 7 | BELL | ORANGE |
| 00 | CHERRY | APPLE | PLUM |

SLOT MACHINE

CROSS-REFERENCE TO RELATED APPLICATIONS

This application is based upon and claims a priority from the prior Japanese Patent Application No. 2007-163989 filed on Jun. 21, 2007, the entire contents of which are incorporated herein by reference.

BACKGROUND

1. Field

The slot machine according to one or more aspects of the present invention relates to a slot machine that has a display that displays a plurality of symbols and is adapted to award a payout based on a symbol combination displayed on the display.

2. Description of Related Art

Conventionally, in a slot machine, which is one type of a gaming machine, a game is started by inserting coins, or the like, in the gaming machine. In the game, a symbol string is variably displayed in a predetermined area in the gaming machine, and after the lapse of a predetermined period of time, the symbol string is stopped and displayed. Then, a payout is awarded based on a combination of the symbols thus stopped.

Generally, whether or not a winning combination for which a payout is awarded is established is determined depending on whether a predetermined number of the same kind of symbols (for instance, "CHERRY" and "7") are positioned along a pay line set in advance. Conventionally, if a predetermined number or more of the same kind of symbols are positioned, a payout was also awarded based on the number of symbols thus positioned, irrespective of the pay line.

Further, generally, a value of the payout to be awarded in case a winning combination for which a payout is awarded has been established is fixed to one kind with respect to one winning combination. A technology is also proposed in which this payout value can be changed. For instance, the specification of the U.S. Pat. No. 6,802,778B1 discloses a gaming machine in which one payout table can be selected, by an operator's operation, from a plurality of payout tables in which the value of the payout respectively differs with respect to the same winning combination, and a determination is made on whether the payout tables comply with regulations.

However, although in the conventional slot machine described above, it is possible to change the value of the payout which is associated to the same winning combination by modifying the payout table, between identical payout tables, the value of the payout is fixed to one value.

Many progressive slot machines adapt a so-called progressive payout according to which a portion of the gaming values consumed in the slot machine during a game are accumulated and gaming values which have been accumulated till the present are awarded at one time if a predetermined condition is satisfied (for instance, a predetermined symbol(s) is(are) stopped on the pay line). However, the above-described conventional slot machine is not compatible with the above-mentioned progressive payout, resulting in a lack of flexibility.

The object of the present invention is to provide a slot machine in which the value of the award can be variously modified while being versatile as far as application to slot machines having a progressive payout is concerned, thereby improving the entertainment characteristic.

SUMMARY

Therefore, in order to achieve the object, according to a slot machine of the present invention encompassing one or more aspects thereof, there is provided a slot machine. The slot machine comprises a display that displays a plurality of symbols, a command accepting portion that accepts a command, and a processor. The processor selects any of a plurality of kinds of game modes, including at least a first game mode and a second game mode, in accordance with a signal inputted from the command accepting portion. The processor executes, if the first game mode has been selected, a first game in which a fixed payout is awarded if a specific win has been established, the specific win being associated with a symbol combination displayed on the display. The processor executes, if the second game mode has been selected, a second game in which a portion of gaming values consumed in each game are accumulated and a progressive payout is awarded based on the gaming values thus accumulated, if the specific win which is associated with the symbol combination displayed on the display has been established. As a result, the value of the award corresponding to the winning combination can be variously changed while employing the same slot machine, thereby improving an entertainment characteristic. This technology can also be applied to the slot machine having the progressive award, thereby providing a higher versatility.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

FIG. 1 is a view showing a payout as applied to the case that the operator has selected a first game mode in a slot machine according to the one embodiment of the present invention;

FIG. 2 is a view showing a payout as applied to the case that the operator has selected a second game mode in a slot machine according to the one embodiment of the present invention;

FIG. 5 is a front view showing a symbol display portion of a slot machine according to the one embodiment of the present invention;

DETAILED DESCRIPTION

Figure 3:
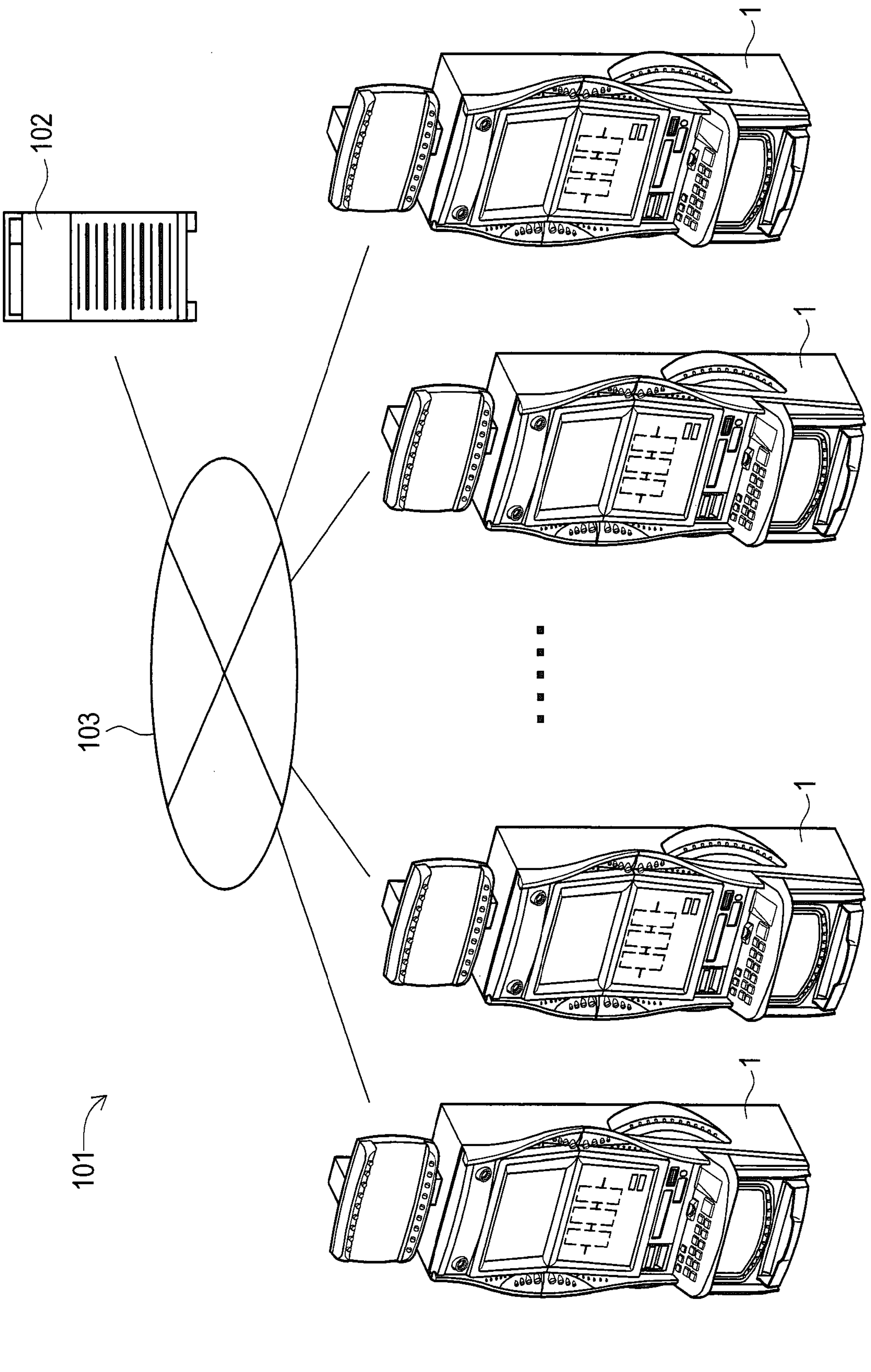
FIG. 3 is a schematic diagram showing a configuration of the game system according to the one embodiment of the present invention.

The various aspects summarized previously may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

It is noted that various connections are set forth between items in the following description. It is noted that these connections in general and, unless specified otherwise, may be direct or indirect and that this specification is not intended to be limiting in this respect.

A slot machine according to one or more aspects of the invention will be described in detail with reference to the drawings based on an embodiment embodying one or more aspects of the invention. However, it is appreciated that one or more aspects of the present invention may be embodied in distributable (via CD and the like) or downloadable software games, console games, and the like. In this regard, the slot machine may be a virtual slot machine that is displayed on a multi-purpose computer and/or dedicated kiosk. Aspects of the invention are described by way of hardware elements. However, it is appreciated that these elements may also be software modules that are executable in a computer. The software modules may be stored on a computer readable medium, including but not limited to a USB drive, CD, DVD, computer-readable memory, tape, diskette, floppy disk, and the like. For instance, aspects of the invention may be embodied in a JAVA-based application or the like that runs in a processor or processors. Further, the terms “CPU”, “processor”, and “controller” are inclusive by nature, including at least one of hardware, software, or firmware. These terms may include a portion of a processing unit in a computer (for instance, in multiple core processing units), multiple cores, a functional processor (as running virtually on at least one of processor or server, which may be local or remote). Further, in network-based gaming systems, the processor may include only a local processor, only a remote server, or a combination of a local processor and a remote server.

It is contemplated that one or more aspects of the invention may be implemented as computer executable instructions on a computer readable medium such as a non-volatile memory, a magnetic or optical disc. Further, one or more aspects of the invention may be implemented with a carrier signal in the form of, for instance, an audio-frequency, radio-frequency, or optical carrier wave.

Next, a detailed description will be given on a one embodiment relating to a slot machine according to the present invention, while referring to the accompanying drawings. The slot machine according to the following embodiment is a so-called hybrid-type slot machine in which a heretofore known transparent liquid crystal panel is installed at a front face of a plurality of mechanical reels which are rotatably supported, and a game is carried out by displaying various kinds of symbol images which are drawn on the outer periphery of the mechanical reels through the transparent liquid crystal panel.

The slot machine according to the present invention is characterized in that either of two game modes, including a first game mode in which a game is carried out based on a fixed payout only and a second game mode in which a game is carried out based on a progressive payout, can be selected based on an operation by an operator, and a game is executed based on the selected game mode.

For instance, FIG. 1 shows one example of a payout in the slot machine as applied to the case that a first game mode has been selected by the operator. Alternatively, FIG. 2 shows one example of a payout in the slot machine as applied to the case that the second game mode has been selected by the operator.

The slot machine to be described hereinafter is provided with three reels. The symbol strings that constitute each reel are each made up of combinations of the following symbols: “RED 7”, “BLUE 7”, “BELL”, “APPLE”, “CHERRY”, “STRAWBERRY”, “PLUM” and “ORANGE”.

When a game is executed in the slot machine described above based on the first game mode, if three of the symbols including “BELL”, “APPLE”, “CHERRY”, “STRAWBERRY”, “PLUM” and “ORANGE” are repositioned on the pay line, a fixed payout amount set in advance is awarded to the player. With respect to the symbols “CHERRY” and “ORANGE”, even if one or two of these symbols have been repositioned on the pay line, a payout amount set in advance is awarded to the player in accordance with the number of repositioned symbols. Further, if three symbols “RED 7” or “BLUE 7” are stopped together along the pay line, a fixed payout amount is awarded to the player and at the same time, a free game is started in place of the base game.

On the other hand, when a game is executed in the slot machine based on the second game mode, if three symbols “RED 7” are stopped together along the pay line, a progressive payout is awarded in place of the fixed payout.

Hereinafter, a description will first be given with respect to a schematic configuration of a game system 101 including a slot machine 1 according to the present embodiment. FIG. 3 is a schematic diagram showing a configuration of the game system 101 according to the present embodiment.

As shown in FIG. 3, the game system 101 according to the present embodiment is made up of a plurality of slot machines 1 which are installed inside a gaming arcade, a server 102 which is installed inside the same gaming arcade, and a network 103 that connects the slot machines 1 and the server 102 so as to allow communication therein between. The configuration of the slot machine 1 will be described in detail later.

Here, the network 103 is made up of a communication channel, such as LAN (Local Area Network), for instance, supporting two-way communication. The slot machine 1 and the server 102 carry out reception and transmission of information with respect to various games, via the network 103. For instance, when a bet operation has been carried out in the slot machine 1 as will be described later, the corresponding bet information is transmitted from the slot machine 1 to the server 102. If the slot machine 1 has won a jackpot (hereinafter referred to as JP), an accumulated amount for the progressive payout which was accumulated until the present is transmitted from server 102 to the slot machine 1 with the win outcome. Further, if the operator operating the server 102 selects a game mode at any of the connected slot machines 1, a signal corresponding to the selected game mode is transmitted to the above-mentioned slot machine 1. As will be described later, the slot machine 1 that received the signal switches the current game mode to the game mode corresponding to the signal. The slot machine 1 according to the present embodiment has only two kinds of game modes, including a first game mode in which a game is carried out based on a fixed payout only, and a second game mode in which the game is carried out based both on a fixed payout and a progressive payout.

The server 102 is installed in a retail store and has a keyboard, a mouse, a display and the like which are not shown. Various types of operations are executed by an operator. The server 102 has a memory area provided therein for storing the accumulated amount for the current progressive payout. Here, the game system 101 according to the present embodiment accumulates, as a progressive payout, a portion of the gaming values on which a bet was placed at the slot machine 1 in which a game is executed in the second game mode, inside each slot machine 1 connected to the server 102. More specifically, each slot machine 1 accumulates and stores, as a progressive payout, 1.0% of the gaming values betted by the player. The accumulated gaming values are awarded if three "RED 7" symbols are positioned along a pay line in the slot machine 1 during the execution of a game in the second game mode, as will be described later.

Figure 4:
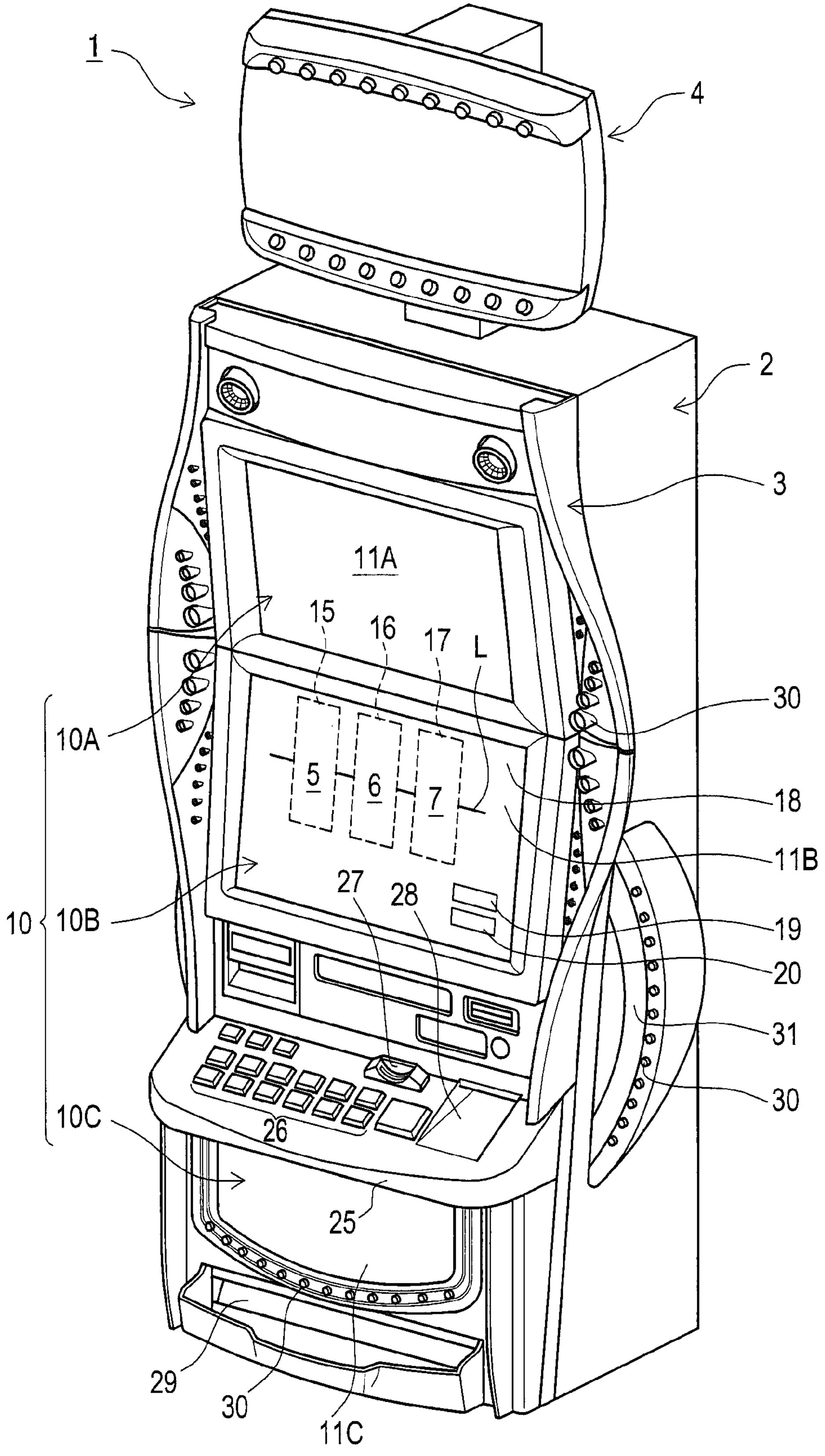
FIG. 4 is a perspective view showing an outer appearance of a slot machine according to the one embodiment of the present invention.

Next, a schematic configuration of the slot machine 1 according to the present embodiment will be described based on FIG. 4. FIG. 4 is a perspective view showing an outer appearance of the slot machine 1 according to the present embodiment.

The slot machine 1 according to the present embodiment is an upright-type slot machine positioned in a gaming arcade such as a casino or the like. This slot machine 1 has a cabinet 2, a main door 3 provided at a front face of the cabinet 2, and a topper effect device 4 arranged at an upper side of the cabinet 2.

The cabinet 2 is a housing portion that houses electrical or mechanical components. These electrical or mechanical components are used in execution of a predetermined game aspect. The cabinet 2 has three reels (specifically, left reel 5, center reel 6 and right reel 7) which are rotatably provided therein. Reels 5 through 7 each have a symbol column drawn on an outer periphery thereof (refer to FIG. 5). The symbol column is constituted of 22 symbols. A main liquid crystal panel 11B to be described later is arranged in front of the reels 5 though 7.

The main door 3 has an upper display portion 10A, a variable display portion 10B and lower display portion 10C provided as a display portion 10 for displaying information with respect to the game. The upper display portion 10A is constituted of an upper liquid crystal panel 11A arranged above the variable display portion 10B. The upper liquid crystal panel 11A displays, for instance, effect images, introduction to game contents, explanation of game rules, a payout table, and the like. The lower display portion 10C is arranged below the variable display portion 10B. This lower display portion 10C is constituted of a plastic panel 11C onto which an image is printed. In the lower display portion 10C, the plastic panel 11C is illuminated by backlights.

The variable display portion 10B is constituted of the main liquid crystal panel 11B and is adapted to display an execution state of the game. The main liquid crystal panel 11B is a heretofore known transparent liquid crystal panel secured to the main door 3.

The main liquid crystal panel 11B has three display windows 15, 16 and 17 formed therein (refer to FIG. 3). Station 1 renders the back side of the display windows 15, 16 and 17 visible by placing these display windows in a transmission state. As a result, a player can visually recognize the symbols drawn on reels 5 through 7 via the respective display windows 15 through 17.

As shown in FIG. 4, etc., one pay line L is displayed on the main liquid crystal panel 11B in the variable display portion 10B. This pay line L is a line that runs in a horizontal direction across a mid portion of the symbol display area corresponding to reels 5 through 7 and defines a symbol combination. Accordingly, if the symbol combination that was repositioned on the pay line L is a predetermined winning combination, the station 1 awards a payout in accordance with the winning combination and the credit amount that was bet (bet amount).

A touch panel 18 is provided at a front face of the main liquid crystal panel 11B. Thus, the player can input different types of commands by operating of the touch panel 18.

A payout amount display portion 19 and a credit amount display portion 20 are provided at a right lower part of the variable display portion 10B. The payout amount display portion 19 displays the payout amount and the like as the awarded payout amount. The payout amount display portion 19 displays a payout amount which is awarded if the symbol combination repositioned on the pay line L in a base game is a predetermined combination. On the other hand, the credit amount display unit 20 displays the credit amount that an actual player has.

An operation table 25 is provided at a front face of the cabinet 2. The operation table 25 is arranged between the variable display portion 10B and the lower display portion 10C so as to protrude towards the front side. A plurality of types of operation buttons 26 are arranged on this operation table 25. Operation buttons 26 include a BET button, a collecting button, a start button and a CASHOUT button and the like. The operation table 25 has a coin insertion slot 27 and a bill insertion portion 28. The coin insertion slot 27 accepts coins representing a gaming value inside the cabinet 2. The bill insertion slot 28 accepts bills inside the cabinet 2.

In the slot machine 1 directed to the present embodiment, coins, bills or electronic valuable information (credit) corresponding to these are used as gaming values. However, the gaming values applicable to this invention are not limited to these items and may also include medals, tokens, electronic money or tickets, for instance.

Also, a coin tray 29 is provided at a lowermost portion of the cabinet 2. This coin tray 29 receives the coins paid out by a hopper 64. A light emitting portion 30 is arranged at a periphery of cabinet 2 in station 1. The light emitting portion 30 lights up in a predetermined lighting fashion in the event of a win or during the free game. A speaker 31 is provided at a side face of the cabinet 2 and is adapted to output sounds in accordance with the progress of the game.

The slot machine 1 also has a topper effect device 4 provided at an upper side of cabinet 2. This topper effect device 4 has a rectangular board shape and is arranged so as to become substantially parallel with the upper display portion 10A.

Next, a description will be given based on FIG. 5 with respect to symbols which are drawn on the reel band of a left reel 5, a center reel 6 and a right reel 7, and which are repositioned while being scrolled on the main liquid crystal panel 11B, through each of the display windows 15 through 17 in a base game and free game. FIG. 5 is a view showing a frame format of symbol strings drawn on the reel band of the left reel 5, the center reel 6 and the right reel 7.

The reel bands of reels 5 through 7 each contain 22 symbols drawn thereon. The respective symbol strings are made up of combinations of symbols including "RED 7", "BLUE 7", "BELL", "APPLE", "CHERRY", "STRAWBERRY", "PLUM" and "ORANGE". The predetermined kinds of symbols are respectively positioned in a predetermined sequence.

When a game is executed in the slot machine 1 based on the first game mode, if three symbols "BELL", "APPLE", "CHERRY", "STRAWBERRY", "PLUM" and "ORANGE" are stopped and displayed along the pay line, a payout amount set in advance is awarded to the player (refer to FIG. 1). Even if one or two symbols "CHERRY" and "ORANGE" are repositioned along the pay line, a payout amount set in advance is awarded to the player in accordance with the number of the repositioned symbols. If three symbols "RED 7" or "BLUE 7" are stopped and displayed along the play line L, a fixed payout amount is awarded and at the same time, a free game is started after switching from the base game (refer to FIG. 1).

On the other hand, when a game is executed in the slot machine based on the second game mode, if three symbols "RED 7" are stopped and displayed along the pay line L, a progressive payout is awarded in place of the fixed payout (refer to FIG. 2). Payouts based on symbols other than "RED 7" are the same as those in the first game mode. In the symbol strings shown in FIG. 5, code numbers are allocated with respect to each symbol constituting these symbol strings, in a downward sequence.

Figure 6:
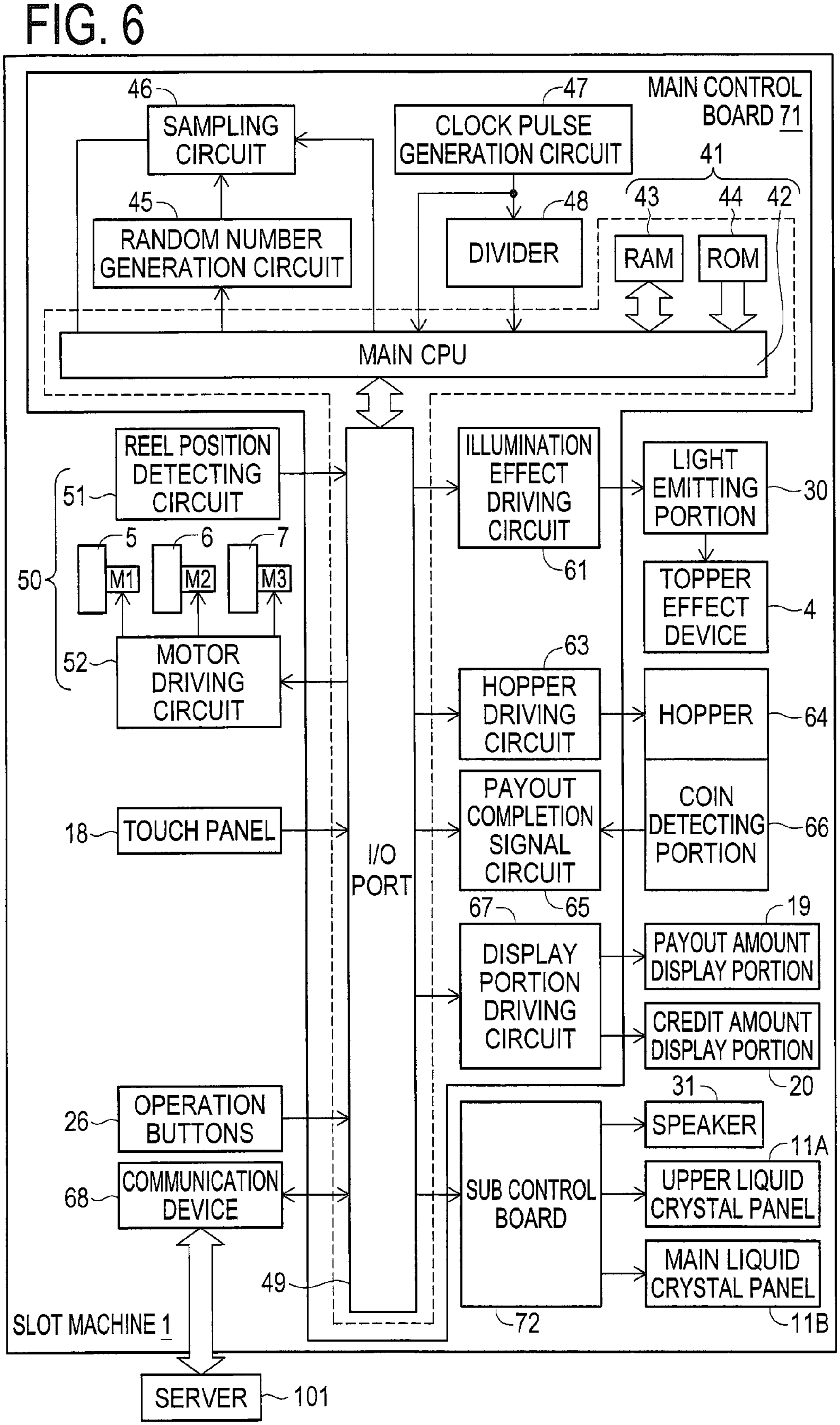
FIG. 6 is a block diagram showing an internal configuration of a entire slot machine according to the one embodiment of the present invention.

Next, the internal construction of slot machine 1 directed to the present embodiment will be described in detail by referring to the drawings. FIG. 6 is a block diagram showing the internal construction of slot machine 1.

Figure 12:
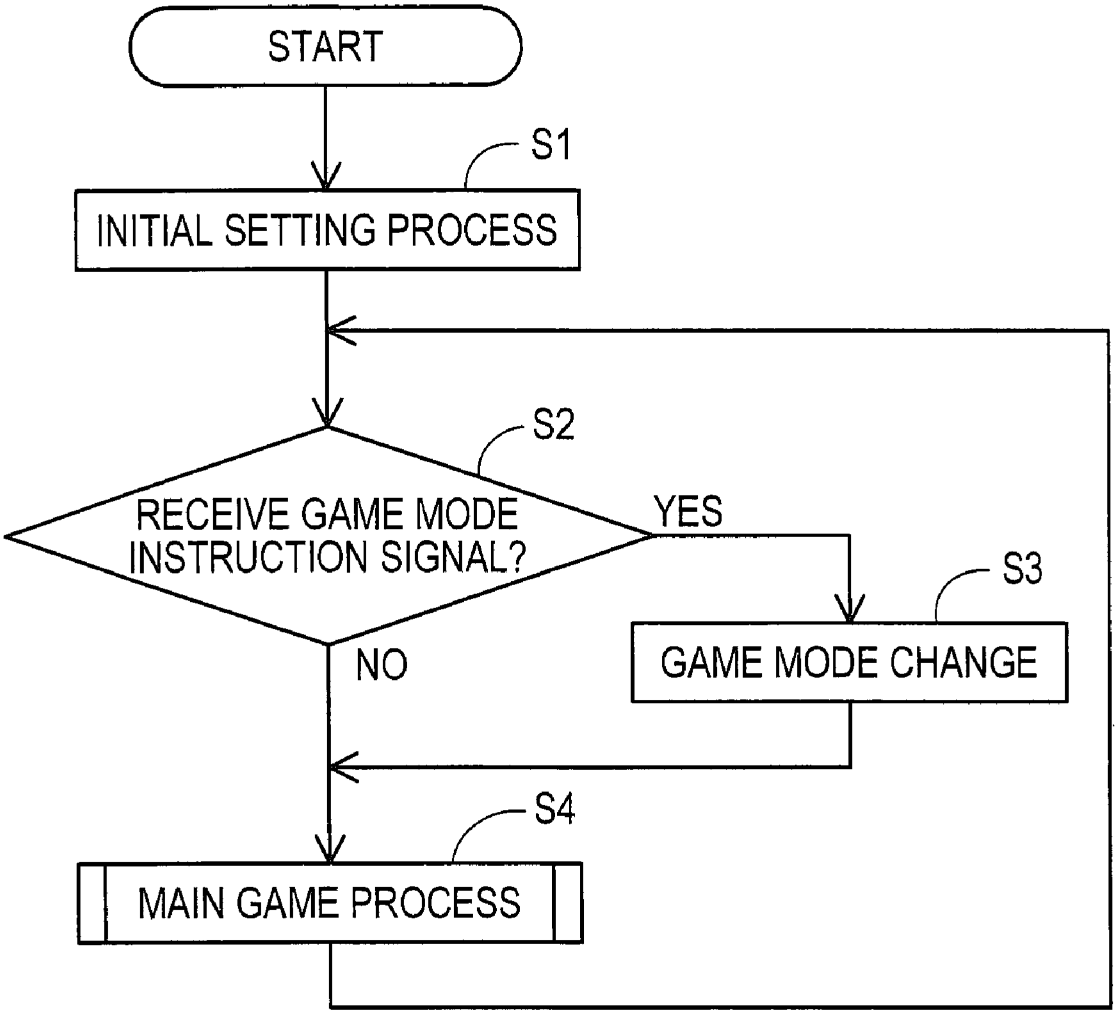
FIG. 12 is a flowchart showing a main control program executed in the slot machine according to one embodiment of the present invention.
Figure 13:
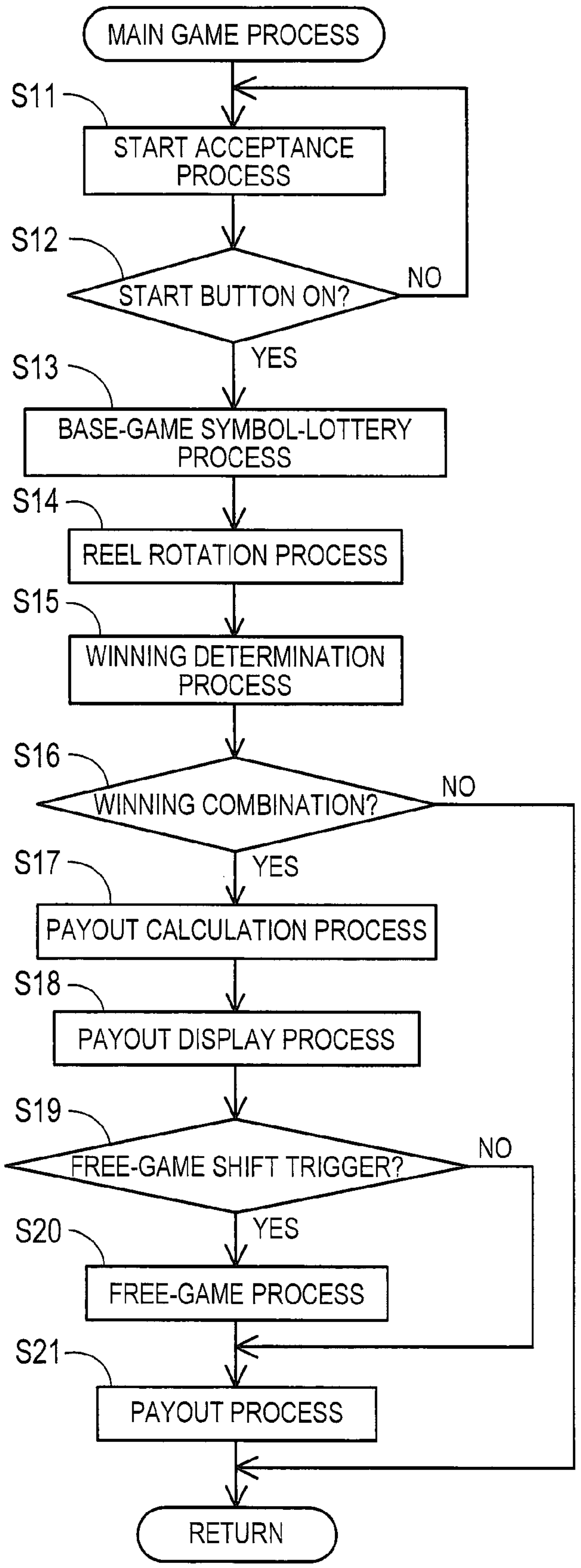
FIG. 13 is a flowchart showing a main game process program executed in the slot machine according to one embodiment of the present invention.

As shown in FIG. 6, station 1 has a plurality of constituting elements, with a main control board 71 as a core. The main control board 71 has a controller 41 for executing control programs and the like to be described later (FIG. 12 and FIG. 13). As was described in the above, the controller 41 functions as a processor in the present invention, together with the overall controller 91.

The main control board 71 has the controller 41, a random number generation circuit 45, a sampling circuit 46, a clock pulse generation circuit 47 and a divider 48.

The main control board 71 also has an illumination effect driving circuit 61, a hopper driving circuit 63, a payout completion signal circuit 65 and a display portion driving circuit 67.

Controller 41 has a main CPU 42, a RAM 43 and a ROM 44. The main CPU 42 inputs/outputs signals to/from the other constituting elements through an I/O port 49 to execute a program stored in ROM 44. The main CPU 42 thus serves as the core for controlling station 1. RAM 43 temporarily stores data and programs to be used when the main CPU 42 is operational. For instance, RAM 43 temporarily stores random number values which were sampled by a sampling circuit 46 to be described later. The RAM 53 stores code numbers corresponding to the respective reels 13 through 17. The ROM 44 stores various types of programs that will be executed by the main CPU 42, as well as permanent data.

More particularly, the programs stored in ROM 44 include a game program and a game system program (hereinafter referred to as a game program, etc.). Further, this game program also includes a lottery program. The lottery program serves to decide code numbers for each reel 5 through 7. These code numbers correspond to symbols each repositioned on the pay line L, as will be described later.

The lottery programs are used to determined the code numbers for the respective reels 5 through 7 corresponding to the respective symbols which are re-positioned on the pay line L of the main liquid crystal panel 11B. This lottery program includes symbol weighing data for each of the respective 3 reels 5 through 7. The symbol weighing data shows correspondence relationships between the respective code numbers and one or a plurality of random number values within a predetermined number value range (for instance 0 through 255). The probability of lottery with respect to each symbol is set by associating one or a plurality of random number values to one code number. The random number values are drawn by lottery and symbols which have been finally identified from the random number values are re-positioned on the main liquid crystal panel 11B.

The lottery program for determining the symbols to be positioned may also employ weighing data in which the predetermined random number range is associated to the symbol combination. In this case, first, the symbol combination is selected by lottery based on the lottery program, and thereafter, the symbol combination thus determined is re-positioned in the main liquid crystal panel 11B.

The random number generation circuit 45 operates in response to a command from the main CPU 42 to generate random numbers in a definite range. The sampling circuit 46 extracts an arbitrary random number from the random numbers generated by the random number generation circuit 45 in response to a command from the main CPU 42. The sampling circuit 46 inputs the extracted random numbers to the main CPU 42. The clock pulse generation circuit 47 generates a reference clock for activating the main CPU 42. Then, the divider 48 inputs a signal obtained by dividing the reference clock by a fixed period, to the main CPU 42.

A reel driving unit 50 is connected to the main control board 71. This reel driving unit 50 has a reel position detection circuit 51 and a motor driving circuit 52. The reel position detection circuit 51 detects the stop position for each one of the left reel 5, the center reel 6 and the right reel 7. The motor driving circuit 52 inputs a driving signal to motors M1, M2 and M3 which are connected to reels 5 through 7, respectively. Motors M1, M2 and M3 are activated in response to a driving signal inputted from the motor driving circuit 52. As a result, motors M1, M2 and M3 respectively spin reels 5 through 7, and stop them at a desired position.

A touch panel 18 is also connected to the main control board 71. This touch panel 18 identifies the coordinate position of the portion a player has touched. The touch panel 18 identifies where the player touched the panel and in which direction the touched location has moved based on the identified coordinate position information. The touch panel 18 inputs a signal corresponding to the identification results to the main CPU 42 through the I/O port 49.

Operation buttons 26 are also connected to the main control board 71. As was already described, the operation buttons 26 include a start button for instructing execution of the game, a collecting button, a BET button, etc. The buttons included in the operation buttons 26 each input an operation signal to the main CPU 42 through the I/O port 49 upon being held down.

The illumination effect driving circuit 61 outputs an effect signal with respect to the above-described light emitting portion 30 and the topper effect device 4. The topper effect device 4 is connected in series with the illumination effect driving circuit 61 through the light emitting portion 30.

The hopper driving circuit 63 drives a hopper 64 based on the control of the main CPU 42. As a result, the hopper 64 performs a coin payout operation whereby coins are paid out to the coin tray 29. The display portion driving circuit 67 then controls display of the respective display portions including the payout amount display portion 19, the credit amount display portion 20 and the like.

Figure 7:
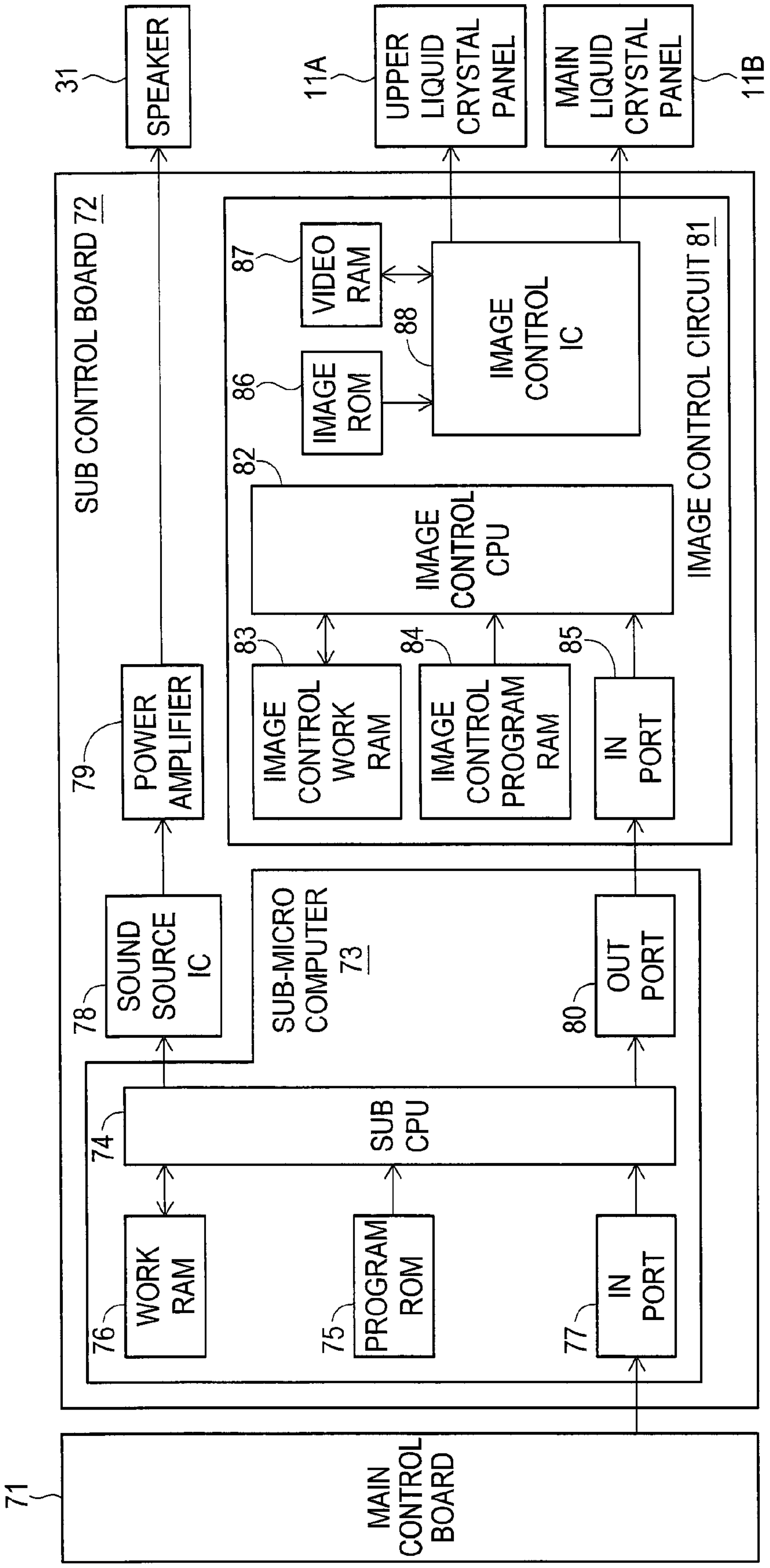
FIG. 7 is a block diagram showing an internal configuration of a sub-control board installed in a slot machine according to the one embodiment of the present invention.

As shown in FIG. 7, a coin detecting portion 66 is connected to the payout completion signal circuit 65. The coin detecting portion 66 measures the number of coins paid out by the hopper 64 and then inputs data on the measured amount of coins to the payout completion signal circuit 65. The payout completion signal circuit 65 judges whether a set number of coins has been paid out, based on the coin amount data inputted from the coin detecting portion 66. If the set number of coins has been paid out, the payout completion signal circuit 65 inputs a signal showing completion of coin payout to the main CPU 42.

As shown in FIG. 7, a sub-control board 72 is connected to the main control board 71. This sub-control board 72 is composed on a circuit board that differs from the main control board 71. The sub-control board 72 controls display of the upper liquid crystal panel 11A and the main liquid crystal panel 11B and controls sound output by speaker 31 based on a command inputted from the main control board 71.

The sub-control board 72 has a micro computer (hereinafter referred to as a sub-micro computer 73) as a main constituting element thereof. The sub-micro computer 73 has a sub-CPU 74, a program ROM 75, a work RAM 76, and I/O ports 77 and 80. The sub-CPU 74 performs a control operation in accordance with a control command transmitted from the main control board 71. The program ROM 75 stores a control program executed by the sub-CPU 74. The work RAM 76 is constituted as a temporary storage section for use when the above control program is executed by the sub-CPU 74.

The sub-control board 72 executes random number sampling upon an operation program of the sub-CPU 74. The sub-control board 72 carries out processes similar to those of the clock pulse generation circuit 47, the divider 48, the random number generation circuit 45 and the sampling circuit 46 provided on the main control board 71.

The sub-control board 72 also has a sound source IC 78, a power amplifier 79 and an image control circuit 81. The sound source IC 78 controls the sound outputted from the speaker 31. The power amplifier 79 amplifies the sound output. The image control circuit 81 operates as a display control section of the upper liquid crystal panel 11A and the main liquid crystal panel 11B.

The image control circuit 81 has an image control CPU 82, an image control work RAM 83, an image control program ROM 84, an image ROM 86, a video RAM 87 and an image control IC 88. The image control CPU 82 decides the image to be displayed on the upper liquid crystal panel 11A and the main liquid crystal panel 11B in accordance with the image control program and the parameters set in the sub-micro computer 73.

The image control program ROM 84 stores an image control program and different types of select tables relating to the display for the upper liquid crystal panel 11A and the main liquid crystal panel 11B. The image control work RAM 83 is a temporary storage section used when the image control program is executed in the image control CPU 82. The image control IC 88 forms images according to the contents decided by the image control CPU 82 and outputs these images to the upper liquid crystal panel 11A and the main liquid crystal panel 11B.

The image ROM 86 stores dot data for forming images. The video RAM 87 functions as a temporary storage section for use when an image is formed by the image control IC 88.

Figure 8:
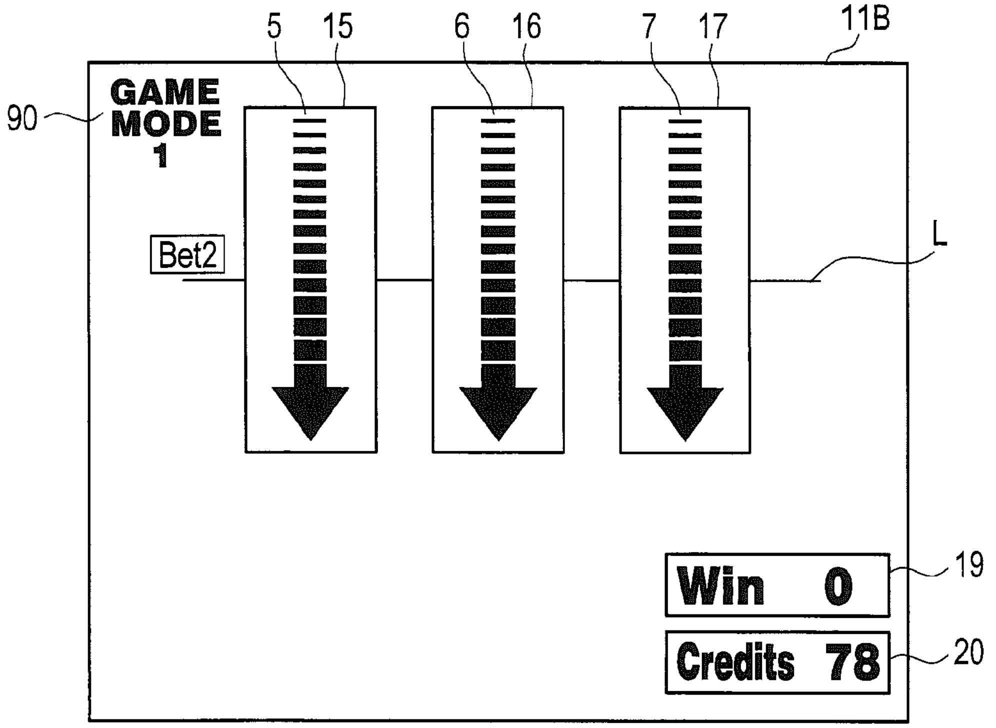
FIG. 8 is an explanatory view showing a game picture displayed in a main liquid crystal panel when a base game is executes in a slot machine according to the one embodiment of the present invention.
Figure 9:
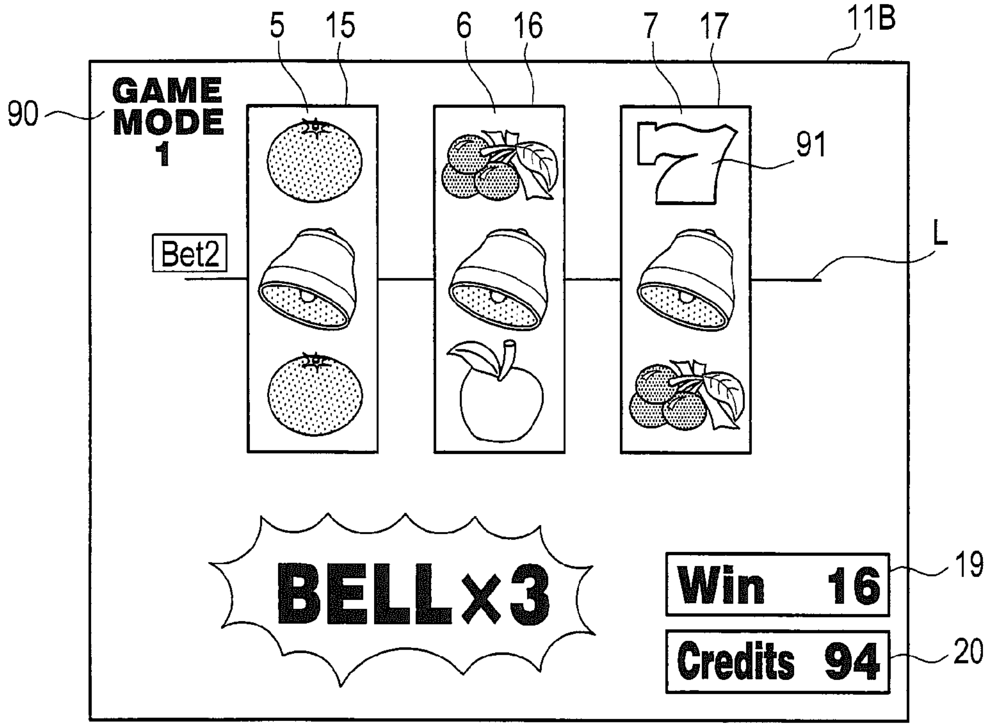
FIG. 9 is an explanatory view showing a game picture displayed in a main liquid crystal panel when a base game is executes in a slot machine according to the one embodiment of the present invention.

Next, a base game and a free game to be carried out in the slot machine 1 having the above configuration will now be described. First, the base game will be described. The base game is a slot game in which a predetermined symbol combination is repositioned along a pay line L on the main liquid crystal panel 11B through the respective reels 5 through 7. More specifically, the player operates the operation buttons 26 to set the bet amount, and when he/she depresses the START button, the respective reels 5 though 7 start rotating. As a result, the symbol strings drawn on the reel band of the reels 5 through 8, as shown in FIG. 8, are displayed in a scrolled manner in a downward direction, through the respective display windows 15 through 17 which are in a transparent state. After the lapse of a predetermined period of time, the respective reels 5 through 7 are stopped automatically in a predetermined sequence. In accordance with this, a portion of the symbol string (three symbols in each reel, totaling 9 symbols 91) which is drawn on the reel band of reels 5 through 7 are respectively repositioned on the main liquid crystal panel 11B, through the respective display windows 15 through 17 which are in a transparent state, as shown in FIG. 9.

Here, various types of winning combinations are set in advance based on combinations of the symbols which have been repositioned on the main liquid crystal panel 11B in the base game. When a symbol combination corresponding to the winning combination has been established by three symbols that were repositioned along the pay line L of the main liquid crystal panel 11B, an amount obtained by multiplying the payout amount in accordance with the winning combination thus established by the bet amount is awarded. When the second game mode is being executed in the slot machine 1, in particular, if three symbols "RED 7" are positioned along the pay line L, a progressive payout is awarded.

At the top left corner of the main liquid crystal panel 11B is provided a game mode display portion 90 that notifies the type of the current game mode. If a first game mode is executed in the slot machine 1, a message reading "GAME MODE 1" is displayed. Alternatively, if a second game mode is executed in the slot machine 1, a message reading "GAME MODE 2" is displayed.

On the other hand, the free game executed in the slot machine 1 is a game which is carried out after switching over from the base game, if a predetermined condition is satisfied. Here, the number of times for the free game is determined by lottery. The free game is ended after the game has been successively executed by a predetermined number of times, and then, the game mode switches over to the base game again. The procedure of the free game is the same as that for the base game, with the exception that gaming values (credits) corresponding to the bet amount are not consumed at the start of the game, and the game is automatically carried out successively without requiring the player to operate the operation button 26. Thus, further detailed description thereof is hereby omitted.

Next, the winning combinations and the corresponding award amounts in the case that a base game and a free game are carried out using the reels 5 through 7 in the slot machine 1 according to the present embodiment will be described based on FIG. 1 and FIG. 2.

Here, the payout amounts shown in FIG. 1 and FIG. 2 show the payout amount in the case that the bet amount is "1". Accordingly, if the bet amount is "1", the payout amounts shown in FIG. 1 and FIG. 2 are paid out. If the bet amount is "2" or more, an amount obtained by multiplying the payout amounts shown in FIG. 1 and FIG. 2 by the bet amount will be paid out. The bet amount during the free game is set to the same bet amount as the bet amount for the based game immediately before the free game is started.

Figure 10:
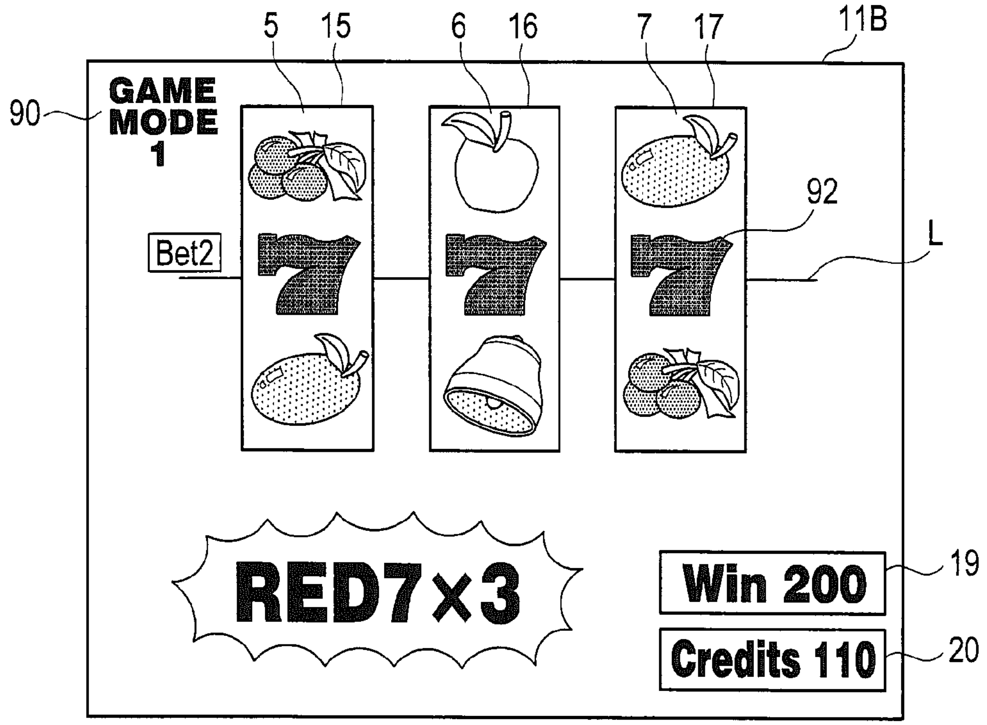
FIG. 10 is an explanatory view showing a game picture displayed in a main liquid crystal panel when a first game mode is executes in a slot machine according to the one embodiment of the present invention.

When a first game mode is being executed, if 3 "RED 7" symbols 92 are repositioned on the pay line L in the main liquid crystal panel 11B as shown in FIG. 10, an amount obtained by multiplying the bet amount by 100 credits is paid out. Further, in a base game, a free game start trigger is won and a free game is executed in place of the base game. If the symbols are repositioned during the free game, only an amount obtained by multiplying the bet amount by 100 credits will be paid out.

Figure 11:
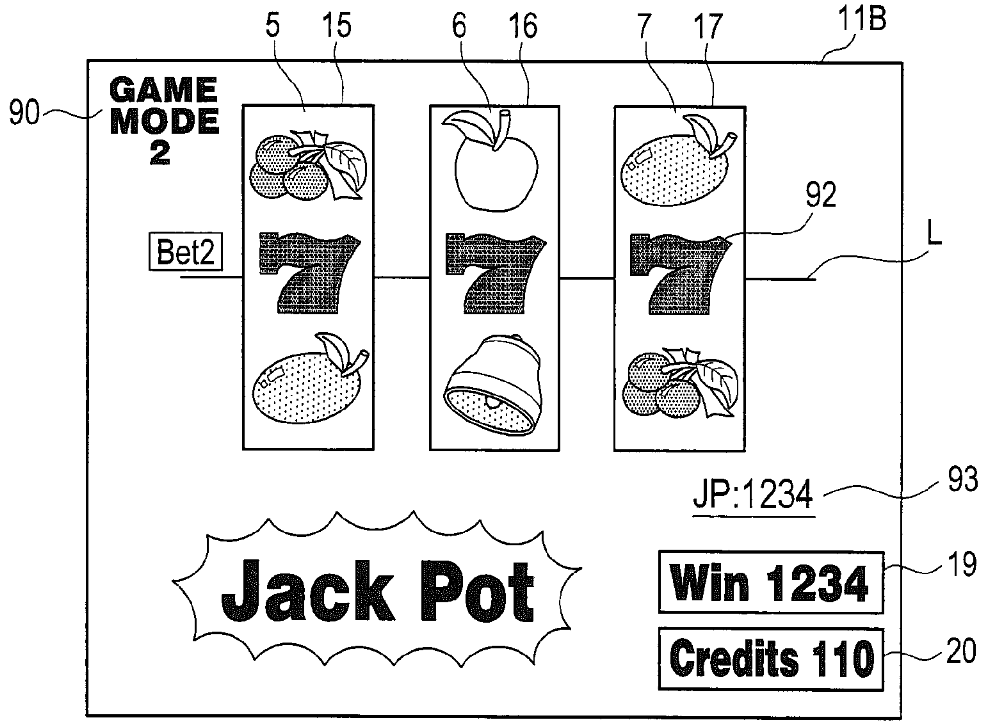
FIG. 11 is an explanatory view showing a game picture displayed in a main liquid crystal panel when a second game mode is executes in a slot machine according to the one embodiment of the present invention.

On the other hand, when the second game mode is executed, if three "RED 7" symbols 92 are repositioned on the pay line L of the main liquid crystal panel 11B, as shown in FIG. 11, a progressive payout which has been accumulatively stored in the server 102 until the present is paid out. If the slot machine 1 is executing the second game mode, a progressive payout amount 93 showing the current progressive payout value accumulated in the server 102 is displayed on the main liquid crystal panel 11B.

Whatever the game mode which is being executed at present, if three "BLUE 7" symbols are repositioned on the pay line L of the main liquid crystal panel 11B, an amount obtained by multiplying the bet amount by 10 credits will be paid out, and a free game is executed.

If three "BELL" symbols are repositioned on the pay line L of the main liquid crystal panel 11B, an amount obtained by multiplying the bet amount by 8 credits will be paid out.

Hereinafter, the payout amount for each winning combination shown in FIG. 1 and FIG. 2 is set in a similar manner. The case in which a combination made up of three symbols which were repositioned on the pay line L in the main liquid crystal panel 11B does not correspond to any of the winning combinations shown in FIG. 1 and FIG. 2, is referred to as losing, and no payout is awarded with respect to losing.

Next, a main control program to be executed in the slot machine 1 according to the first embodiment will be described in detail while referring to the drawings. FIG. 12 is a flow chart showing a main control program.

First, when the power switch is turned on (upon power on), the main control board 71 activates the sub-control board 72 and the controller 41 executes an initial setting process at step (hereinafter referred to as S) 1. In the initial setting process, the main CPU 42 executes the BIOS stored in the ROM 44 and expands the compressed data incorporated in the BIOS in the RAM 43. In executing the BIOS that was expanded in the RAM 43, the main CPU 42 carries out a diagnosis and initialization of the different types of peripheral devices. Further, the main CPU 42 writes the game programs and the like from the ROM 44 into the RAM 43 to acquire payout rate setting data and country identification information. While executing the initial setting process, the main CPU 42 also carries out an authentication process with respect to each program.

Next, at step S2, the main CPU 42 determines whether or not a signal commanding switch over of the game mode has been received at the communication device 68 from the server 102. If the player has carried out an operation to select the game mode of the slot machine 1 from the first game mode and the second game mode in the server 102, a signal commanding switch over of the game mode will be transmitted from the server 102.

If it is determined that the signal commanding switch over of the game mode is received from the communication device 68 (S2: YES), a game mode corresponding to the received signal is selected from the first game mode and the second game mode and the following game processes are executed in the selected game mode (S3). On the other hand, if it is determined that the signal commanding switchover of the game mode is not received from the communication device 68 (S2: NO), the flow shifts to step S4.

If the switchover from the game mode has been made, the main CPU 42 performs control so that the payout table which was displayed on the upper liquid crystal panel 11A is changed to a payout table corresponding to the game mode following switchover.

Then, at step S4, the main CPU 42 sequentially reads and executes the game programs and the like from the RAM 43, thereby carrying out a main game process. The game in the slot machine 1 according to the present embodiment is carried out by executing the main game process. The main game process is repeatedly executed while power is supplied to the slot machine 1.

Next, a sub-process of the main game process at the above-described step S2 will now be described based on FIG. 13. FIG. 13 is a flow chart of a main game process program to be executed in the slot machine 1 according to the first embodiment. The programs shown in the flow charts at FIG. 13 as will be described later are stored in the ROM 44 and RAM 43 provided in the slot machine 1 and is executed in the main CPU 42.

As shown in FIG. 13, the main CPU 42 first executes a start acceptance process at step S11. In the start acceptance process, the player inserts coins and carries out a betting operation using the BET button from amongst the operation button 26. The main CPU 42 transmits the control signal to the sub-control board 72, thereby shifting to or maintaining the respective display windows 15 through 17 of the main liquid crystal panel 11B in a transparent state.

At step S12, the main CPU 42 determines whether or not the START button from amongst the operation buttons 26 has been depressed. This determination is carried out based on the signal inputted to the main CPU 42 in response to depression of the START button. Here, if the start button has not been depressed (S12: NO), the flow returns to the start acceptance process (S11). As a result, the player can carry out an operation to correct, etc. the bet amount. Alternatively, if the start button has been depressed (S12: YES), the main CPU 52 subtracts the bet amount set based on the above-described bet operation from the credit amount that the player currently possesses and at the same time stores the result as bet information in the RAM 43. Information concerning the set bet amount is transmitted to the server 102. If a game is executed based on the second game mode, in particular, the server 102 accumulates and stores 1.0% of the gaming value betted in the slot machine 1, as progressive payout.

At step S13, the main CPU 42 executes a symbol lottery process for the base game. In this symbol lottery process, the main CPU 42 selects by lottery a symbol to be positioned on the main liquid crystal panel 11B. More specifically, the main CPU 42 executes the lottery program stored in the RAM 43, thereby sampling random number values from a number value range within a predetermined random number value range. The main CPU 52 then determines the symbols (specifically, stop position of reels 5 through 7), that will be positioned on the pay line L, based on the sampled random number values and the symbol weighing data.

Next, at step S14, the main CPU 42 carries out a reel rotation process. Specifically, the main CPU 42 causes a motor driving circuit 52 to drive the respective motors M1, M2 and M3, thereby causing the respective reels 5 though 7 to start rotating. Then, the main CPU 42 determines an effect pattern (pattern for image display onto the main liquid crystal panel 11B and audio output from the speaker 31) with respect to a unit game and the effect of the effect pattern thus determined is started under the control of the sub-control board 72 and the like. When a predetermined stop timing comes when the rotating respective reels 5 through 7 are stopped, the main CPU 42 carries out a reel stop process, causing the respective reels 5 through 7 to stop based on the code numbers stored in the RAM 43, under the control of the motor driving circuit 52. Thus, the symbol combination determined at the above-described step S13 is repositioned on the pay line L of the main liquid crystal panel 11B.

Then, at step S15, the main CPU 42 carries out a winning determination process to determine whether or not the symbol combination that was repositioned on the pay line L is any of the winning combinations for which a payout is awarded. This determination is carried out based on the code numbers of the respective reels 5 through 7 stored in the RAM 43.

If it is determined, at the above-mentioned step S15 that the winning combination has been established (S16: YES), the flow shifts to step S17. Alternatively, if it is determined that the winning combination has not been established (S16: NO), the main game process is ended. In the case where a game is next started, the processes following step S11 are carried out once again.

At step S17, the main CPU 42 calculates a payout based on the established winning combination. Even in the case of the same winning combination as described above, the payout thus calculated differs depending on whether the game is executed in the first game mode or in the second game mode. More specifically, in case of the second game mode, if three "RED 7" symbols 92 are repositioned along the pay line L, as shown in FIG. 10, an amount obtained by multiplying the bet amount by 100 credits will be paid out as a payout.

Alternatively, in case of the second game mode, of three "RED 7" symbols 92 are repositioned on the pay line L as shown in FIG. 11, a progressive payout which is currently stored is acquired from the server 102 and the acquired progressive payout is calculated as a payout. The winning combination based on symbols other than "RED 7" is the same, irrespective of the game mode, and a payout is calculated based on the kind and number of positioned symbols as shown in FIG. 1 and FIG. 2.

Next, at step S18, the main CPU 42 sends the player a notification by displaying the kind of the established winning combination and the contents of the payout with respect to the main liquid crystal panel 11B. For instance, if the bet amount is 2 bets and three "BELL" symbols 91 are displayed along the pay line L, as shown in FIG. 9, a message reading "BELL× 3" is displayed with respect to the main liquid crystal panel 11B. Also, the number "16" corresponding to the credit amount to be paid out is displayed with respect to the payout amount display portion 19.

Next, at step S19, the main CPU 42 determines whether or not the free game shift trigger has been established. More specifically, if three "RED 7 (only during the first game mode)" or "BLUE 7" symbols 91 are repositioned along the pay line L of the main liquid crystal panel 11B, a determination is made that the free game shift trigger is established.

If it is determined that the free game shift trigger has been established (S19: YES), the flow shifts to the free game process (S20). In the free game process, the symbol lottery process and the reel rotation process are carried out repeatedly in a successive manner by a predetermined number of times (for instance, 5 times), without the consumption of gaming values. If the winning combination has been established, a payout (refer to FIG. 1 and FIG. 2) is accumulatively calculated based on the winning combination thus established. The symbol weighing data to be used for symbol lottery in the free game may be the same as that in the base game, or data concerning establishment of the winning combination with a higher probability than in the base game. On the other hand, if it is determined that the free game shift trigger has not been established (S19: NO), the flow shifts to step S21.

At step S21, the main CPU 42 pays out to the player a payout based on the established winning combination. At this time, the payout can be made using coins corresponding to the credit amount (1 credit corresponds to 1 coin), in response to the depression of the CASHOUT button from among the operation buttons 26. The payout can also be made using bar-code attached tickets. If a free game has been carried out, a payout which was accumulated during the free game is paid out at one time to the player.

As was described hereinbefore, in the slot machine 1 according to the present embodiment, either of a first game mode and a second game mode is selected based on the operation of an operator carried out in the server 102 (S3). If the first game mode is selected, a payout is calculated and awarded based on a fixed payout (FIG. 1) which was set in advance for each winning combination (S17, S21). Alternatively, if the second game mode is selected, a payout is calculated and awarded based on a progressive payout and the fixed payout (FIG. 2) which was set in advance for each winning combination. Thus, a payout value corresponding to the winning combination can be variously modified while using the same slot machine 1, thereby improving the entertainment characteristics of the slot machine. The invention is thus also applicable to a slot machine having a progressive payout, thereby providing high versatility.

Further, the payout value corresponding to the winning combination can be modified based on the intention of the operator. Thus, even if only the same kind of slot machines are installed in the retail store, this technology can accommodate the demands of both a player who aims for a progressive payout and a player who aims for a fixed payout, thereby improving versatility of the slot machine.

The present invention is not limited to the above-described embodiment and various modifications and alterations can be made thereto without departing from the scope of the present invention.

For instance, in the present embodiment, a description was given concerning the case that the game mode shifts to the free game if three predetermined symbols ("RED 7" or "BLUE 7" symbol) are positioned together on the pay line L in the base game. However, the conditions for shifting to the free game may also include other conditions. For instance, if at least one or more specific symbols are included in the positioned symbols, the game mode may shift to the free game. Also, the free game may be generated unexpectedly, as a mystery bonus, without any relationship to positioned symbols.

In the present embodiment, the present invention is applied with respect to a game system 101 in which a plurality of slot machines 1 and a server 102 are connected. However, the present invention can also be applied with respect to a slot machine 1 only. In this case, the progressive payout is accumulated separately for each slot machine. Also, the operator can select the game mode by operating the slot machine 1.

The selecting operation of the game mode may also be carried out by the player. In this case, a SELECT button is preferably provided among the operation buttons 26 for selecting the game mode.

Figure 14:
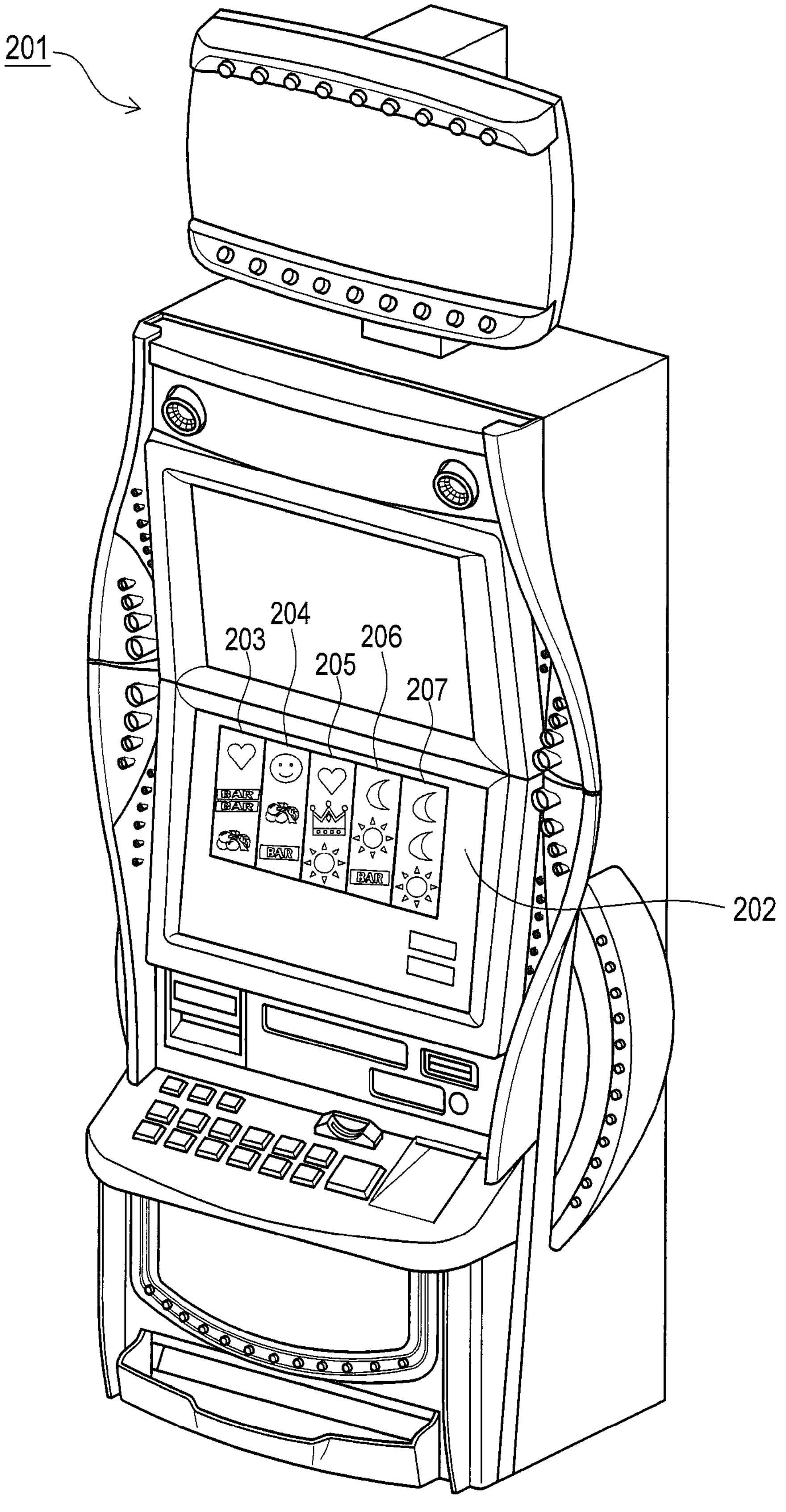
FIG. 14 is a perspective view showing an outer appearance of a slot machine according to another embodiment of the present invention.

The slot machine 1 according to the present embodiment carries out a slot game using three mechanical reels, however, it may also use 5 reels or 9 reels. Further, the present invention can be applied to a video-reel slot machine, as well. For instance, the slot machine 201 shown in FIG. 14 is provided with a heretofore known liquid crystal panel 202. Reels are rotated and stopped by performing scrolled display and stopped display of the images of the respective kinds of symbols using the 5 video reels 203 through 207 displayed on the liquid crystal panel 202, whereby the game is executed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A slot machine connected to a plurality of slot machines via a network, the slot machine and the plurality of slot machines being connected to a server that includes a memory area that stores portions of gaming values that have been bet by the slot machine and the plurality of slot machines accumulatively as a progressive payout, each of the slot machines having:

a display that displays a plurality of symbols;

a bet button that inputs a bet operation;

a command accepting portion that accepts a command; and a processor that executes processes as follows:

(a) a process of selecting any of a plurality of kinds of game modes, including at least a first game mode and a second game mode, in accordance with a signal inputted from the command accepting portion in response to an operation by an operator of the server or a player;

(b) a process of executing, if the first game mode has been selected, a first game in which a fixed payout is awarded if a specific win has been established, the specific win being associated with a symbol combination displayed on the display; and (c) a process of executing, if the second game mode has been selected, a second game in which:

(c-1) a process of transmitting information about a bet amount that is set based on the bet operation with the bet button to the server so as to store the portions of the gaming values that have been bet by the bet operation inputted with the bet button, and (c-2) if the specific win associated with the symbol combination displayed on the display has been established, a process of obtaining a fixed payout or a progressive payout from the server as award, the fixed payout being predetermined for each established specific win and the progressive payout being an amount stored in the memory area as accumulation of the portions of the gaming values that have been input with the bet button.

2. The slot machine according to claim 1, wherein signal(s) is/are outputted to the command accepting portion(s) of any of the slot machine(s) or the plurality of slot machines connected to the server in response to an operation by the operator of the server.

3. A slot machine connected to a plurality of slot machines via a network, the slot machine and the plurality of slot machines being connected to a server that includes a memory area that stores portions of gaming values that have been bet by the slot machine and the plurality of slot machines accumulatively as a progressive payout, each of the slot machines having:

a display that displays a plurality of symbols;

a bet button that inputs a bet operation;

a command accepting portion that accepts a command; and a processor that executes processes as follows:

(a) a process of selecting any of a plurality of kinds of game modes, including at least a first game mode and a second game mode, in accordance with a signal inputted from the command accepting portion in response to an operation by an operator of the server or a player;

(b) a process of executing, if the first game mode has been selected, a first game in which a fixed payout is awarded if a specific win has been established, the specific win being associated with a symbol combination displayed on the display; and (c) a process of executing, if the second game mode has been selected, a second game in which:

(c-1) a process of transmitting information about a bet amount that is set based on the bet operation with the bet button to the server so as to store the portions of the gaming values that have been bet by the bet operation inputted with the bet button, and (c-2) if the specific win associated with the symbol combination displayed on the display has been established, a process of obtaining a fixed payout or a progressive payout from the server as award, the fixed payout being predetermined for each established specific win and the progressive payout being an amount stored in the memory area as accumulation of the portions of the gaming values that have been input with the bet button, wherein the kinds of symbols and symbol arrangement order drawn on each of the reels are the same irrespective of a first game mode and a second game mode while payout tables are switched between the first game mode and the second game mode along with the change of game modes.

4. A slot machine connected to a plurality of slot machines via a network, the slot machine and the plurality of slot machines being connected to a server that includes a memory area that stores portions of gaming values that have been bet by the slot machine and the plurality of slot machines accumulatively as a progressive payout, each of the slot machines having:

a display that displays a plurality of symbols;

a bet button that inputs a bet operation;

a command accepting portion that accepts a command; and a processor that executes processes as follows:

(a) a process of selecting any of a plurality of kinds of game modes, including at least a first game mode and a second game mode, in accordance with a signal inputted from the command accepting portion in response to an operation by an operator of the server or a player;

(b) a process of executing, if the first game mode has been selected, a first game in which a fixed payout is awarded if a specific win has been established, the specific win being associated with a symbol combination displayed on the display; and (c) a process of executing, if the second game mode has been selected, a second game in which:

(c-1) a process of transmitting information about a bet amount that is set based on the bet operation with the bet button to the server so as to store the portions of the gaming values that have been bet by the bet operation inputted with the bet button, and (c-2) if the specific win associated with the symbol combination displayed on the display has been established, a process of obtaining a fixed payout or a progressive payout from the server as award, the fixed payout being predetermined for each established specific win and the progressive payout being an amount stored in the memory area as accumulation of the portions of the gaming values that have been input with the bet button, wherein the kinds of symbols and symbol arrangement order drawn on each of the reels are the same irrespective of a first game mode and a second game mode while payout tables are switched between the first game mode and the second game mode along with the change of game modes; and wherein a payout table to be displayed in the display of the gaming machine is changed to a payout table corresponding to a switched game mode.

* * * * *